July 16, 1957     C. R. MURPHY     2,799,710
EXTRACTION PROCESS FOR THE PURIFICATION OF AQUEOUS FORMALDEHYDE
Filed Jan. 10, 1956
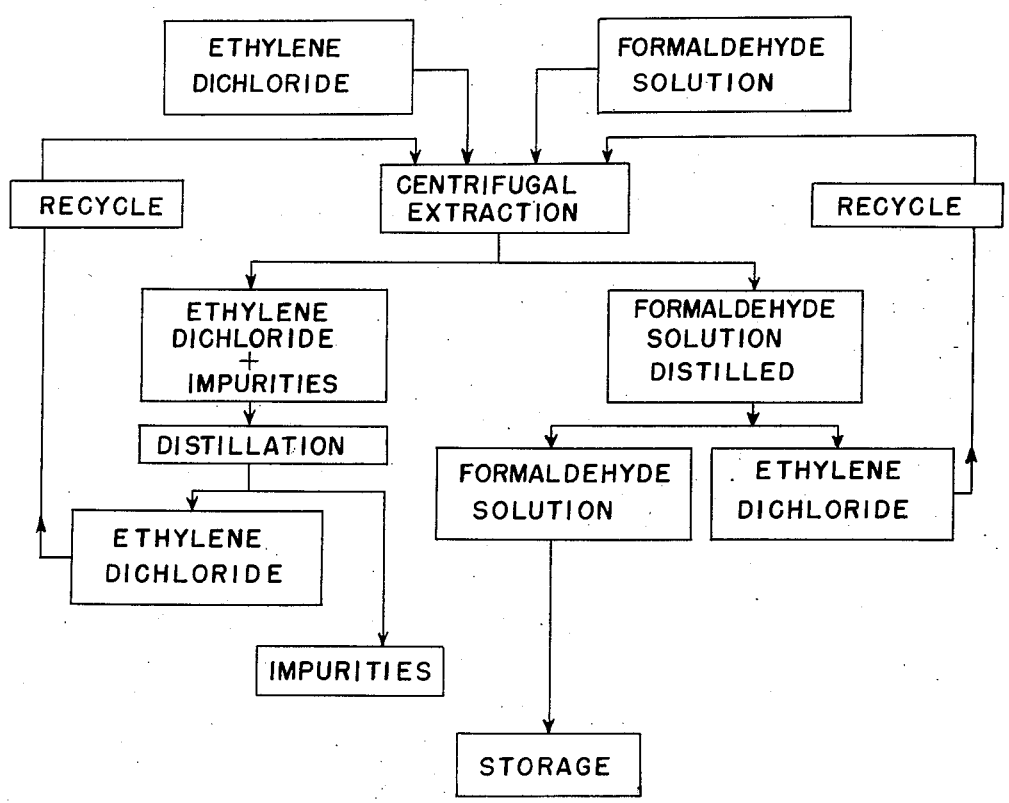
INVENTOR
CLARENCE R. MURPHY
BY
ATTORNEY United States Patent Office
2,799,710
Patented July 16, 1957

2,799,710

EXTRACTION PROCESS FOR THE PURIFICATION OF AQUEOUS FORMALDEHYDE

Clarence R. Murphy, Tulsa, Okla., assignor to Warren Petroleum Corporation, Tulsa, Okla., a corporation of Delaware Application January 10, 1956, Serial No. 558,224

6 Claims. (Cl. 260—606)

This invention relates to processes for purification of aqueous formaldehyde particularly by utilizing solvent extraction to remove impurities from the aqueous formaldehyde, and to the resulting products.

Formaldehyde, obtained today by processes of oxidation either by the partial oxidation of hydrocarbons or catalytic oxidation of impure methanol contains impurities which interfere with the utilization of the formaldehyde for certain industrial processes including production of pentaerythritol or particular resin producing processes.

Removal of impurities from aqueous formaldehyde by extraction methods involves consideration of many factors which complicate the problem. Among properties that need consideration for a satisfactory solvent are boiling point, specific gravity, stability in the system in which it is to be employed, selective extraction properties for the impurities and not for the formaldehyde, separation of the solvent from the impurities and separation of the solvent from the formaldehyde solution, physical separability of the two solutions—one solution being principally solvent carrying the impurities and the other being substantially pure formaldehyde solution free of impurities and carrying only a minor amount of extraction solvent—in the extractor, e. g. whether troublesome emulsification occurs, availability and cost of solvent, etc.

Insofar as stability in the system is concerned, it is necessary to determine by experimentation the hydrolytic stability of the solvent in the mixture in which it is employed. It is true that for some compounds, the literature gives information on hydrolysis and pyrolysis in the presence of water and air and at different temperatures. But it should be noted that the presence of other organic compounds at times may inhibit or accelerate hydrolysis and decomposition rates of such compounds. And the information which is available in the literature may lead away from, rather than toward a particular solvent for use in a particular extraction process. Thus as to ethylene dichloride, the literature states that it hydrolyzes slowly at 80° C. but rapidly at 100° C. in the presence of water. Accordingly ethylene dichloride might be listed along with other compounds that would be ruled out as unsatisfactory from the standpoint of stability based on information gathered from the literature, such other compounds including for example methyl chloride, ethyl chloride, vinyl chloride, vinylidene chloride, chloroacetylene and dichloroacetylene.

As to selective extraction properties, there is no guide whatever since the necessary properties can be determined in each case by research and experimentation only. Chlorinated hydrocarbons found to have unsatisfactory properties by test included carbon tetrachloride, chloroform, trichloroethylene and tetrachloroethylene, while many others were ruled out because of other unsatisfactory properties.

Again, in determining a solvent as to the necessary properties for separation from the extracted impurities, only research and experimentation can be relied on. One cannot safely assume from boiling points alone that solvent may be satisfactorily separated from impurities by distillation since it is unknown whether or not they form azeotropes with the impurities, or whether or not a particular solvent will react with the impurities or any of them, since the impurities present in the particular formaldehyde solutions with which this invention is concerned, have for the most part not been specifically identified; and nothing can be found in the literature in this respect.

Separation of the solvent from the formaldehyde solution must also be determined by research since nothing is published in the literature about the distillation characteristics of these solvents with formaldehyde solutions.

Among the chlorinated hydrocarbons to be considered there may be mentioned carbon tetrachloride; chloroform; methyl chloride; methylene chloride; ethyl chloride; ethylidene chloride; ethylene dichloride; 1,1,1 trichloroethane, 1,1,2 trichloroethane; 1,1,2,2 tetrachloro ethane; vinyl chloride; vinylidene chloride; 1,2 dichloro ethylene; chloro acetylene; and dichloro acetylene. From the data given above it is apparent that one cannot select a suitable solvent from published data but it is necessary to discover the solvent by extensive and unpredictable research and experimentation.

Many of these chlorinated hydrocarbons were investigated to determine their selective solvent properties and many found to be unsatisfactory for a number of reasons. Those which exhibited even one desirable characteristic for these purposes, such as good selective solvent properties, did not follow any homologous series pattern. For example, chloroform, carbon tetrachloride, trichloroethylene and perchloroethylene, did not extract the impurities from the formaldehyde solution. While tetracholoroethane was good with respect to solvent properties, its high boiling point and instability in the presence of water made it impractical. So too, while ethyl chloride displayed good solvent properties and good boiling point, its ease of hydrolysis in the presence of water even when formaldehyde is present, made it impractical. Carbon tetrachloride and chloroform each have one carbon atom in the molecule, as does methylene chloride, but they were unsuitable as a solvent for the practicular purposes herein. Perchloroethylene and ethylidene dichloride both proved unsatisfactory. For example, the density of the latter proved too close to that of the formaldehyde solution to permit good physical separation after extraction. Accordingly as pointed out above, the utility of any particular chlorinated hydrocarbon as a feasible selective solvent in the purification of a particular formaldehyde solution from impurities cannot be predicted.

Among the objects of the present invention is the purification of aqueous formaldehyde obtained by oxidation processes including partial oxidation of hydrocarbons and catalytic oxidation of impure methanol by the use of ethylene dichloride.

Other objects include the purified aqueous formaldehyde thus obtained.

Still further objects and advantages of the present invention will appear from the more detailed description set forth below, it being understood that such more detailed description may be modified by those skilled in the art without departing from the scope and spirit of this invention.

In connection with that more detailed description the drawing shows a diagrammatic flow sheet of a method utilizing the present invention.

In accordance with the present invention, it has been found that aqueous formaldehyde obtained from oxidation processes including partial oxidation of hydrocarbons and catalytic oxidation of impure methanol in which processes high boiling impurities are present in the aqueous formaldehyde obtained, which impurities interfere with methods of utilization of the aqueous formaldehyde for certain industrial processes including production of pentaerythritol and resins, may be purified for utilization for such purposes by extraction with ethylene dichloride to remove the high boiling impurities from the aqueous formaldehyde and make the latter available for use in the stated processes.

It has been found that ethylene dichloride will extract the impurities from the formaldehyde solution satisfactorily. Ethylene dichloride also has the advantage of having the correct properties which enable it to be separated and recovered from the formaldehyde solution easily without the removal of any appreciable amount of formaldehyde. Also, the ethylene dichloride can be recovered from the impurities economically and recycled back to the extraction system without the loss of any significant amount of solvent.

Ethylene dichloride is a stable and economical solvent to use, being in good supply in all parts of the country, since it is a by-product of the Chlorohydrin Process for the production of ethylene glycol. Further, it has been found that in the presence of a formaldehyde solution, the hydrolysis rate of ethylene dichloride, was very slow even at 100° C. In fact, it was so slow that it did not release enough hydrochloric acid to cause excessive corrosion at that temperature for a period of eight days. Further features which make the ethylene dichloride useful include the following.

It has the right boiling range to enable its recovery from formaldehyde and the impurities. It has a high enough boiling point to enable its use without the use of pressure equipment at ordinary temperatures. Its solvent power for the impurities involved is greater than any other solvent tried. Its solubility in water is very low, which makes its separation from the formaldehyde solution much easier. The solubility of formaldehyde in ethylene dichloride is only about 0.2%, which minimizes any loss of the valuable formaldehyde. Also, ethylene dichloride is readily available at a cost which is much less than most solvents on the market today.

Ethylene dichloride is unique in its action. No other chlorinated hydrocarbons have been found to act in the same way with all of the advantageous effects shown by ethylene dichloride. Even its closest analogue, ethylidene chloride is not comparable since its density, for example, is too close to that of the formaldehyde solution to permit good physical separation after extraction.

The following generally illustrates the process.

Combined streams of ethylene dichloride and formaldehyde solution (which desirably has been stripped of the bulk of the impurities and by-products of the oxidation system by previous fractionation) are brought together into a centrifugal extractor in the desired ratios. The centrifugal extractor has the combined advantage of thoroughly mixing the two streams and then separating them by centrifugal action before they are discharged from the machine. This separation is important since the ethylene dichloride and formaldehyde solution tend to form an emulsion, making them more difficult to separate by decantation or other ordinary means.

The solvent as it leaves the extractor contains the impurities picked up from the formaldehyde solution, and these must be removed before the solvent can be returned to the extraction system for reuse. This is accomplished by merely distilling the solvent away from the impurities, since the impurity has a much higher boiling point than the solvent. The distillate from this solvent recovery column is then in a satisfactory condition to be recycled back to the extractor.

The formaldehyde stream as it comes from the extractor contains a small amount (approximately 0.6 to 1%) of ethylene dichloride. Since ethylene dichloride forms a low boiling azeotrope with water and is itself lower boiling than the formaldehyde solution, it can also be easily removed from the formaldehyde by simply heating and evaporating off this small amount of solvent. This procedure does not entrain any appreciable amount of formaldehyde contained in the original solution.

The formaldehyde as it comes from the still, after the removal of this small amount of solvent, is pure and ready to go to the pure formaldehyde storage.

This process is not limited to any particular concentration of formaldehyde since any concentration can be used, up to the point where formaldehyde polymerizes and becomes a solid, which would be in the vicinity of 50 to 75%, depending on the operating temperature. Furthermore, this process is not limited to any particular temperature conditions since the extraction works equally as well cold or hot.

Any ratio of solvent to formaldehyde can be used, depending on the amount of impurities in the formaldehyde to be extracted.

As shown in the flow sheet of the drawing, the streams of ethylene dichloride and aqueous formaldehyde solution to be purified are introduced into an extraction zone which may be a column operating counter current, but more desirably is a centrifugal extraction zone. Two products are separated by centrifugal action, one being the bulk of the ethylene dichloride carrying substantially all of the impurities originally in the aqueous formaldehyde, and the other product being the aqueous formaldehyde with a small quantity of the solvent, ethylene dichloride. The main ethylene dichloride portion is subjected to distillation to distill off the solvent from the higher boiling imprities, and the distillate may then be recycled in part or in its entirety to the extraction zone, without further treatment.

The aqueous formaldehyde stream from the extractor usually contains a small amount of the order of a fraction of a percent to possibly one percent of ethylene dichloride. This aqueous formaldehyde may then be heated to evaporate off the solvent as an azeotrope, since very little formaldehyde is entrained. The azeotrope overhead may then be recycled in whole or in part to the extraction zone. The formaldehyde solution passes to storage.

*Example*

An aqueous formaldehyde solution obtained as a product of the vapor phase partial oxidation of propane and containing 25% formaldehyde and about 1% impurities was used for this run. 300 grams per minute of the above crude aqueous, 25% formaldehyde was passed through the feed inlet of a centrifugal extractor and 75 grams per minute of ethylene dichloride was passed through the solvent feed inlet to the same centrifugal extratcor. The temperature was maintained in the extractor between 65 and 95° F. The ethylene dichloride and the aqueous formaldehyde solution flow countercurrently to each other and are separated again by the centrifugal action of the machine. The extracted aqueous formaldehyde leaving the extractor is free of impurities and contains .8% ethylene dichloride.

This aqueous formaldehyde solution is fed to a fractionating column where this .8% ethylene dichloride is distilled overhead at 161° F. as an azeotropic mixture containing 80% ethylene dichloride and 20% water. This stream is recycled back to the extractor. The residue from this column is pure formaldehyde and goes to pure formaldehyde storage. The ethylene dichloride stream coming from the centrifugal extractor contained 4% impurities or all of the impurities which were originally in the formaldehyde solution.

This ethylene dichloride is distilled in a fractionating column at 182° F. top temperature. The overhead product is sufficiently free of the original impurities and is recycled back to the extractor. The residue from this column contains the impurities extracted from the formaldehyde and is drained into the sewer.

A very substantial improvement in the purity of the formaldehyde solution treated in the above process was obtained. For example, the percent light transmission on the sulfuric acid wash test rose from an initial value of 4% to as high as 86%. The sulfuric acid light transmission was determined by mixing equal volumes of concentrated sulfuric acid and aqueous formaldehyde and determining the light transmission through the solution using a green filter and a Klett-Summerson colorimeter. The formaldehyde solution also made a good quality pentaerythritol with no color bodies caused by the impurities which was originally in the formaldehyde solution.

The concentration of the crude formaldehyde solution subjected to treatment may vary widely, but should be below that at which substantial polymerization takes place, under the conditions of the treatment. This preferred limit is approximately 60% when operated within the temperature range given below.

The temperature limitation in this system is governed by the boiling point of ethylene dichloride. The upper temperature limit without operating under pressure is the boiling point of ethylene dichloride which is 182° F. None of the other factors such as solubility, specific gravity, etc. is adversely affected within the above given ranges of concentration and temperature. In general then, the preferred operating temperature range is between atmospheric temperature and 182° F. and the preferred concentration range between approximately 10 and 60% formaldehyde.

The amount of impurities in the crude formaldehyde solution may range desirably between 0.17 and 3%. The ratio of solvent to formaldehyde may desirably be in the range of from about 0.2 to 4 parts of solvent to 1 part of formaldehyde solution, the parts being by weight.

The extraction purification of the present invention may be achieved by one pass through a centrifugal or column extractor.

I claim:
1. The method of purifying aqueous formaldehyde obtained from oxidation processes including partial oxidation of hydrocarbons and catalytic oxidation of impure methanol, processes in which high boiling impurities are present in the aqueous formaldehyde obtained which impurities interfere with methods of utilization of the aqueous formaldehyde for certain industrial processes including production of pentaerythritol and particular resin producing processes, the steps consisting essentially in extracting such aqueous formaldehyde containing such high boiling impurities with ethylene dichloride to remove the stated high boiling impurities from the aqueous formaldehyde, and recovering the aqueous formaldehyde freed of said high boiling impurities to enable the aqueous formaldehyde to be utilized in industrial processes in which the removed high boiling impurities would have interfered.

2. The method of claim 1 in which the extraction is carried out by centrifugal action.

3. The method of claim 2 in which the ethylene dichloride containing the high boiling impurities is distilled to separate the ethylene dichloride.

4. The method of claim 2 in which aqueous formaldehyde freed from impurities is heated to distil out ethylene dichloride.

5. The method of claim 4 in which the ethylene dichloride distilled out of the aqueous formaldehyde is recycled to the extraction zone.

6. The method of claim 5 in which the ethylene dichloride containing the high boiling impurities is distilled to separate the ethylene dichloride from the impurities and such ethylene dichloride is recycled to the extraction zone.

References Cited in the file of this patent
UNITED STATES PATENTS
2,636,053    King et al. _____ Apr. 21, 1953